Oct. 2, 1923.

J. B. DANLEY 1,469,384

BATTERY POULTRY COOP

Filed Nov. 1, 1922

Inventor

James Byron Danley,

Attorneys

Oct. 2, 1923.  
J. B. DANLEY  
1,469,384  
BATTERY POULTRY COOP  
Filed Nov. 1, 1922  
3 Sheets-Sheet 2
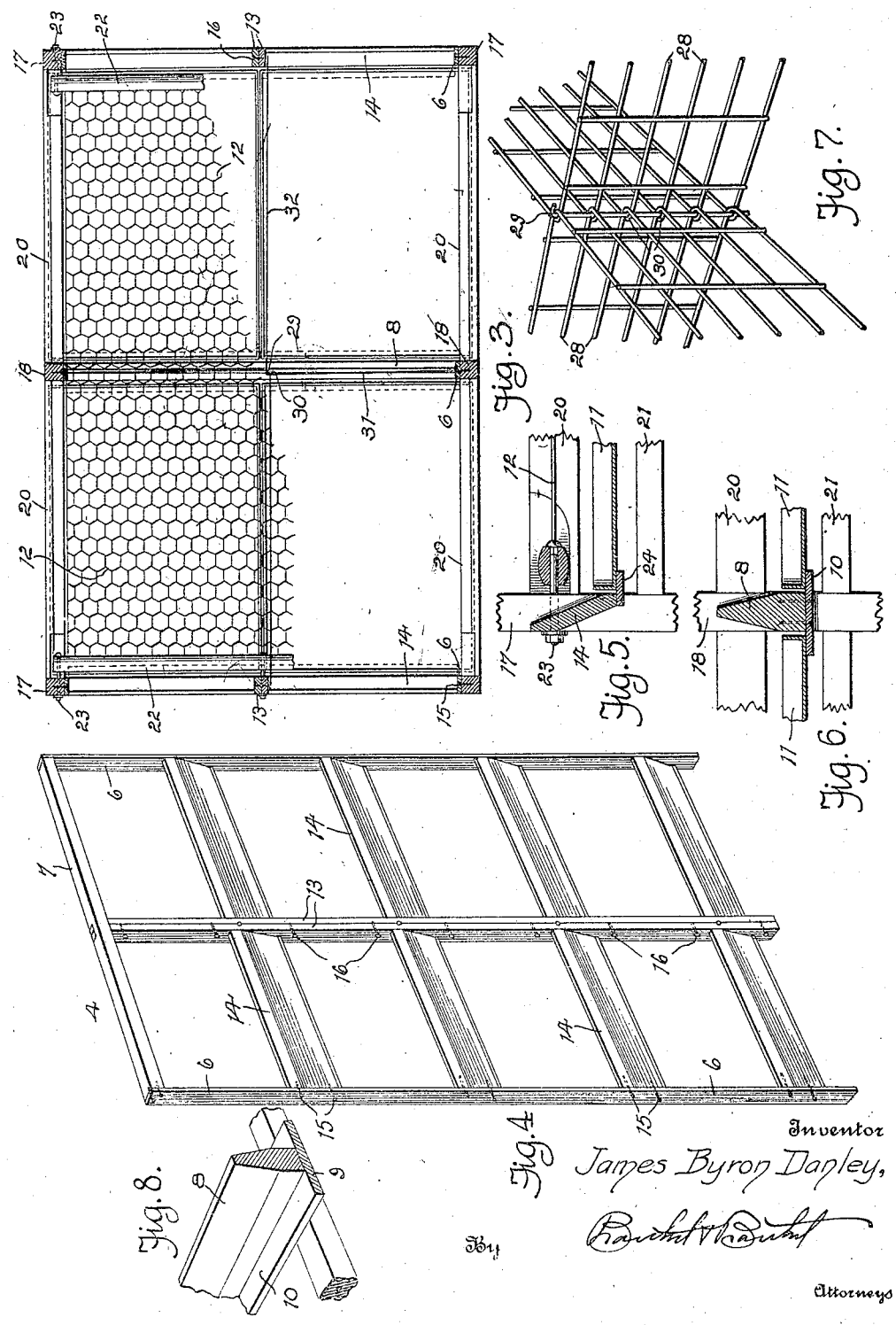

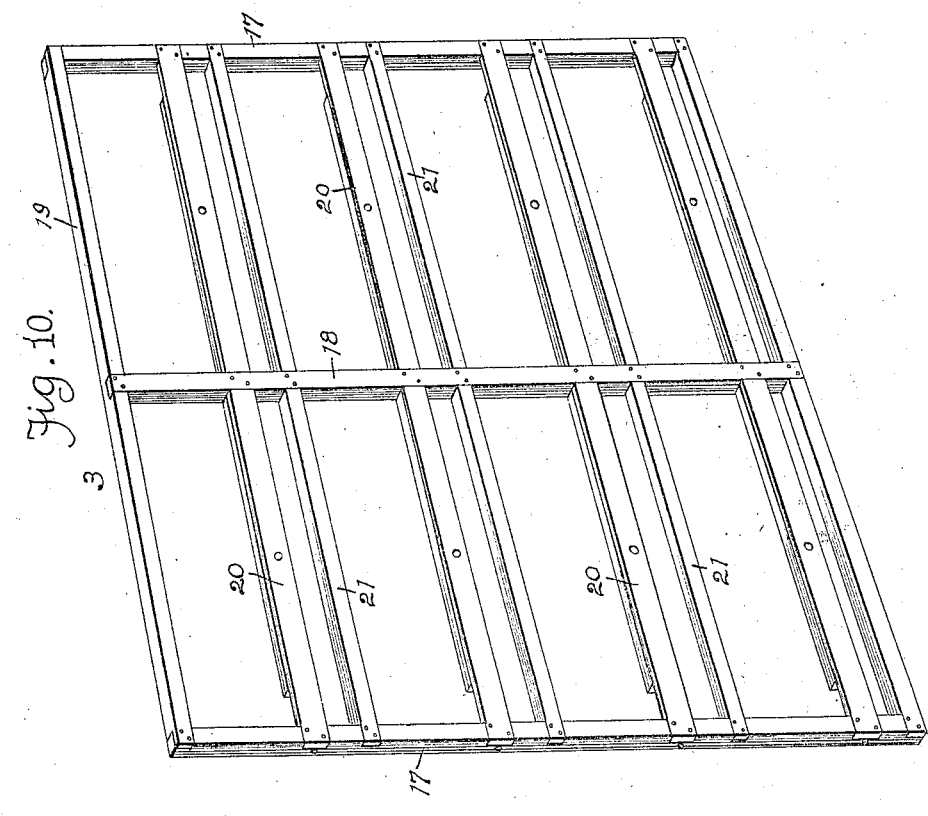
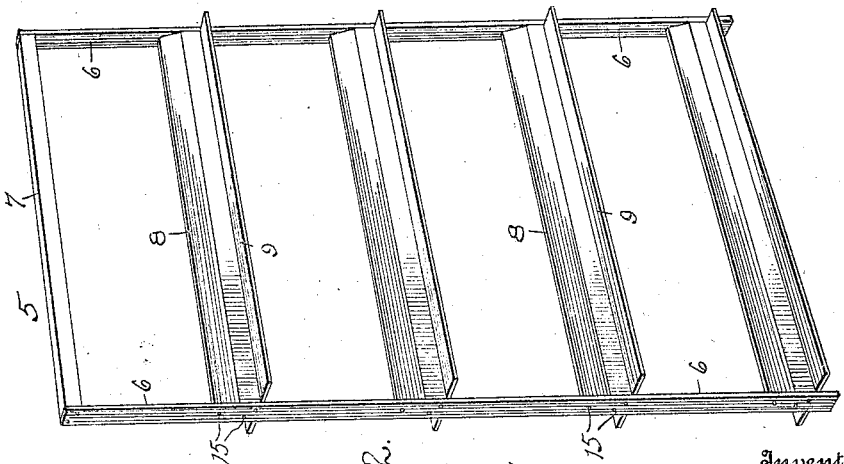
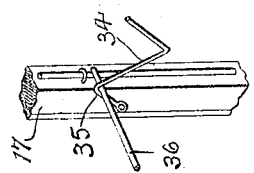
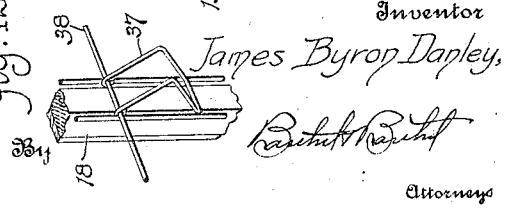

Patented Oct. 2, 1923.

1,469,384

UNITED STATES PATENT OFFICE.

JAMES BYRON DANLEY, OF ST. JOHNS, MICHIGAN.

BATTERY POULTRY COOP.

Application filed November 1, 1922. Serial No. 598,257.

*To all whom it may concern:*

Be it known that I, JAMES BYRON DANLEY, a citizen of the United States of America, residing at St. Johns, in the county of Clinton and State of Michigan, have invented certain new and useful Improvements in Battery Poultry Coops, of which the following is a specification, reference being had therein to the accompanying drawings.

This invention relates to poultry crates or coops, and more particularly to that class of devices shown in my Letters Patent #1,132,764, of March 23, 1915. The invention further relating to such crates or coops which are known as batteries and comprises a series of superposed compartments, the present device comprising two vertical parallel superposed rows of such compartments, and the invention consists in providing a sectional structure which may be readily assembled and when so assembled provides a very strong and rigid coop or battery of large capacity.

The invention further consists in a novel construction and arrangement of parts whereby the cost of manufacture is facilitated and cheapened and wherein the separating foraminous walls between the compartment in each horizontal floor or series, are formed of two continuous strips of fabricated wire dividing the space within the outer walls of the structure into four compartments by bending these strips intermediate their ends and interlocking the strips at these bends so that each strip will form an end wall and the dividing side wall for adjacent compartments.

A further object of the invention is to provide certain other new and useful features in the supporting frame structure and arrangement of trays. It is also an object of the invention to provide a device of this character which is simple in construction and has a very large carrying capacity with a minimum of bulk and weight, and to provide certain other new and useful features in the construction and arrangement of parts. With the above and other ends in view, the invention consists in the matters hereinafter set forth, and more particularly pointed out in the appended claims, reference being had to the accompanying drawings in which—

Figure 1 is a side elevation of a device illustrative of the invention;

Fig. 2 an end elevation of the same with portions broken away to more clearly disclose the construction;

Fig. 3 is a horizontal transverse section;

Fig. 4 is a perspective view of an end frame structure;

Fig. 5 is an enlarged sectional detail of a portion of an end frame and adjacent parts;

Fig. 6 is a similar sectional detail showing a portion of a center frame and adjacent parts;

Fig. 7 is a perspective detail showing the construction and arrangement of foraminous dividing walls between adjacent compartments;

Fig. 8 is a perspective detail of a central cross bar of the central frame;

Fig. 9 is a perspective detail of a central transverse frame showing the cross bars therein, one of which is illustrated in Fig. 8;

Fig. 10 is a perspective detail of a side frame member;

Fig. 11 is a perspective detail showing an end support for a trough and its relation to adjacent parts of the structure, and Fig. 12 is a similar view of a central trough support showing its relation to adjacent parts of the structure.

Figures 1, 2:
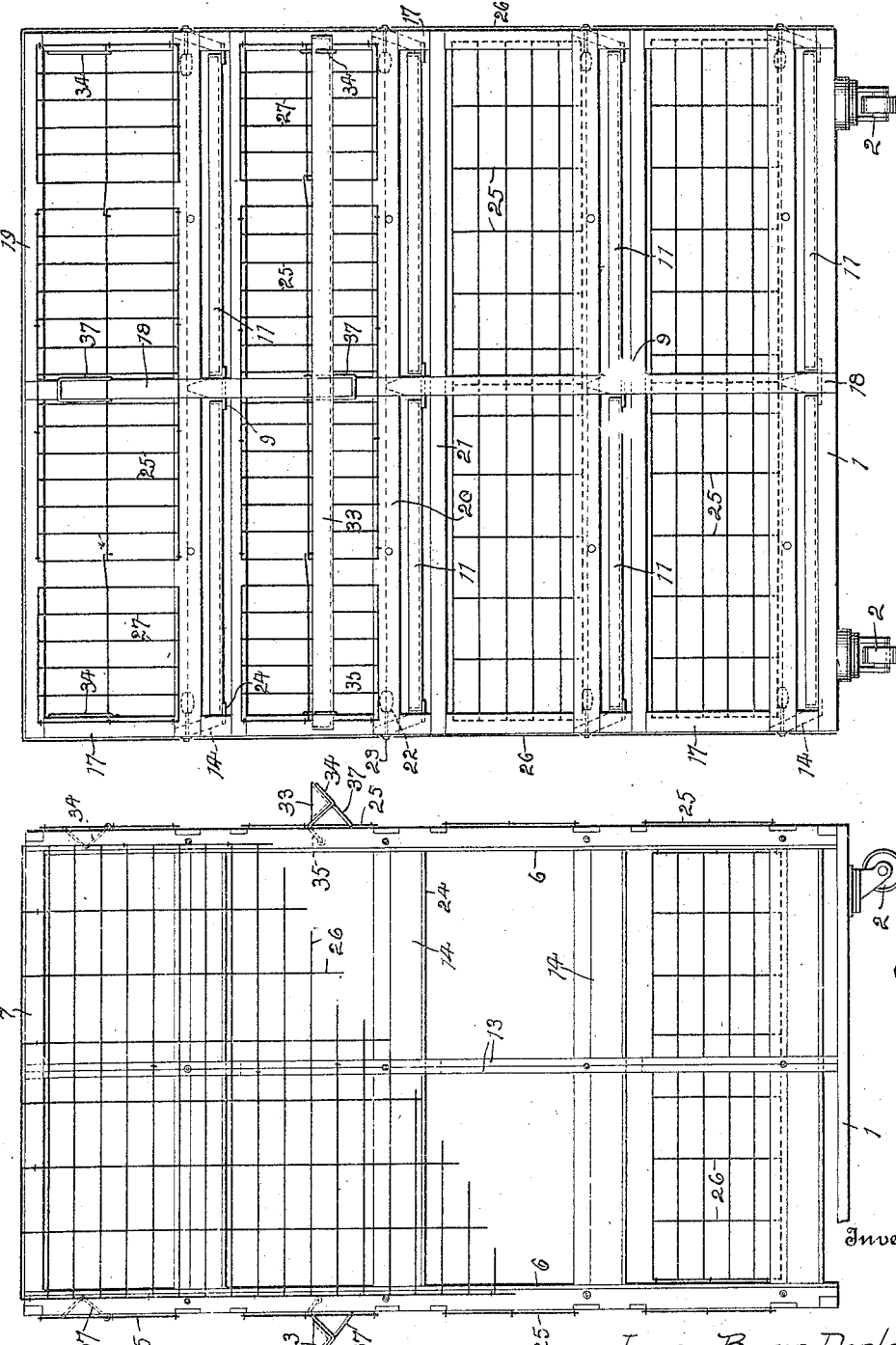

In my patent numbered 1,132,764, previously referred to, I have shown a poultry coop comprising a single vertical column of superposed compartments. In the present structure there are provided two vertical parallel columns of superposed compartments greatly increasing the capacity of the device over that of the prior structure without greatly increasing its weight and bulk, due to the construction and arrangement of parts.

In the drawings, 1 indicates a suitable base frame which is provided with suitable castor wheels 2 so that the frame may be evenly supported upon the floor and readily moved about from place to place. Erected upon the base 1 is a superstructure or frame comprising two side frame members, indicated as a whole by the numeral 3 and shown in Fig. 10. The frame structure also includes two end frame members, indicated as a whole by the numeral 4 and one of which is shown in Fig. 4; and also a central transverse frame member, indicated as a whole by the numeral 5 and shown in Fig. 9. These end and intermediate frames comprise thin vertical side members or slats which are connected at their upper ends by transverse bars 7 and intermediate their ends by transverse bars located adjacent each horizontal dividing wall of the structure or floor of each horizontal series of compartments, the transverse bars 8 of the frame 5 being formed with an upwardly tapering upper edge portion, as shown in Fig. 8, and a horizontally disposed board 9 secured to the lower edge of the bar to provide horizontally laterally extending ledges or flanges 10 providing supports and runways for the several trays 11, there being four of these trays located beneath the foraminous floor 12 for each horizontal series of compartments, one tray beneath each compartment, and which trays may be withdrawn laterally through the side frame 3 to remove them from the structure for the purpose of cleaning. The end frames 4 also each have a pair of thin flat bars or slats 13 extending vertically of the frame and located intermediate the ends thereof with horizontal comparatively wide flat bars 14 secured between the end members 6 and central members 13 by nails or other fastening means driven through the members 6 and 13 into the ends of the bars 14, said fastening nails 15 being driven into place before the bars 13 are assembled in the frame so that when these bars are placed face to face into the frame and secured together by nails 16 or like fastening means, the heads of the nails which are driven therethrough into the end of the bars 14 will be concealed and prevented from getting out. When the end frames 4 are assembled in the frame structure, they are placed between the end posts 17 of the side frames 3 and secured in place by nails driven through the members 6 into these posts. The entire frame structure is therefore made up of frame members or sections which may be readily assembled and when so secured together form a very rigid and strong frame structure.

The two side frames 3 comprise the end posts 17 and a central vertical post 18 with the upper ends of these posts connected by a cross bar 19. The posts 17 and 18 are connected at each floor level by bars 20 and 21 which are spaced apart to provide a frame opening through which the trays 11 may be inserted and withdrawn. The foraminous floor 12 extends from one end frame of the structure to the other end frame thereof, passing through the central frame 5 with each floor stretched tightly and extending just above the upper edges of the bars 8. In order to stretch the floor 12 evenly and tightly, the woven wire fabric comprising each floor is secured at its ends to bars 22 and these bars are detachably and adjustably secured to the posts 17 of the side frames by means of bolts 23 passing through the bars adjacent their ends and through openings in the posts with the outer ends of the bolts screw-threaded to receive nuts adapted to engage the outer faces of the posts and to be turned up thereagainst for the purpose of drawing outwardly on the bolts and thus drawing the bars 22 toward the posts to stretch the wire fabric forming the floor. Each strip of wire fabric 12 thus forms the floor for the four adjacently horizontal compartments and directly beneath this floor are supported the four trays 11, one for each compartment, upon the flanges 10 of the cross bars 8 at one end and at their opposite ends upon strips secured to the lower edges of the cross bars 14 of the end frames 4, said strips extending laterally of the boards to provide supporting ledges or flanges 24 for the ends of the trays adjacent the end frames. The cross bars or boards 14 of the end frames are set at an angle relative to the members 6 and 13 of these frames, being inclined upwardly and outwardly and being formed with comparatively thin upper edges adjacent the outer sides of the frames so that droppings or dirt will not collect upon these bars but will be directed downwardly toward and into the trays. It is for the same purpose that the transverse bars 8 of the central frame 5 are tapered upwardly to provide a narrow upper edge which will not catch the droppings or dirt and will form inclined sides for directing the dirt downwardly into the trays.

After the side and end frames, together with the transverse central frame, have been built up and assembled into the complete frame structure suitable fabricated walls or grating 25 and 26 is secured in any suitable manner to the outer surface of these frames, the end frames being covered by a continuous piece of grating 26 extending from the upper to the lower end thereof to form end walls for the structure and for the several compartments, and separate strips of grating 25 are secured to the side walls at the side frame members 3 between the bars 21 and the next adjacent bar 20 below to form inclosing side walls for the several compartments and a portion of each of these side walls may be in the form of a door 27 which may be opened to gain access to the adjacent compartment.

The several trays may therefore be withdrawn through the slots or openings between the bars 20 and 21 of the side frame members 3.

To divide the space between each floor 12 and the next floor above, and form four separate compartments, one in each corner of the section, foraminous dividing walls are provided by employing two separate strips of suitable fabricated wire or grating, as indicated at 28 in Fig. 7, and bending these strips intermediate their ends and locking them together at the junctures of these bends by means of a vertical locking wire 29 which is run vertically through the aligned openings formed by the overlapping of the bends of wire, as indicated at 30, thus securing these walls together at substantially the vertical center of the structure. One end of each fabricated strip 28 is secured in any suitable manner to the post 18 of one side frame and then extending inwardly to its point of juncture with the other strip is extended longitudinally of the structure and secured at its opposite end to the vertical central members 13 of an end frame. Each fabricated strip 28 thus forms an end wall 31 for adjacent compartments and a central dividing wall 32 for adjacent compartments. This arrangement does not require the securing of dividing walls for each floor space at the center of the structure and greatly facilitates the manufacture of the crate and also decreases its weight. Further, these walls may be disconnected and removed at any time by detaching them from the end and side frames and then pulling out the locking wire 29 which holds them together at their meeting angles.

To facilitate the feeding of the poultry which is placed in the several compartments, V-shaped troughs 33 are supported outside of these compartments upon the side frames 3 to extend from end to end thereof opposite each horizontal row of the compartments, and in order that these troughs may be readily removed and their supports stored within the structure while the crate or battery is in transit or while it is not being used, end supports 34 which are shown in Fig. 11 are provided, these supports consisting of a wire or rod bent at an angle to correspond to the angle of the bottom of the V-shaped trough and again bent adjacent one end to provide an arm 35 which extends at an angle to the trough supporting portion and which arm is formed at its end with an eye to receive a bolt or other fastening means for securing it to the end posts 17 of the frame at the inner side thereof. This support 34 may therefore be swung upon its pivotal connection with the post into the structure alongside the post or may be swung outwardly into position to support the trough, the supporting bracket or arms engaging over a wire or rod 36 as shown in Fig. 11, which wire or rod may be a part of the fabricated side wall or grating.

To support the trough intermediate its ends, a bracket 37, shown in Fig. 12, is formed of wire bent into U-shape with the ends of the wire turned into loops engaging around a wire 38 of the grating at each side of the center post 18, of the frame, and this U-shaped wire loop is bent laterally intermediate its ends so that the closed end of the loop may rest against the outer side of the post when the bracket is in operative position and hold the loop in such a position that the portion thereof adjacent the ends which are secured to the grating will extend outwardly from the grating at an angle to engage beneath one side of the V-shaped trough and form a rest therefor. When the trough is removed, these supporting brackets 37 may be swung upon their pivotal connection with the grating wire 38 upwardly and inwardly with the arms of this U-shaped bracket extending at each side of the post and the connecting end portion resting against the outer face of the post, thus removing these brackets from a projecting position, into the plane of the frame where they are out the way and will not interfere with the moving about or shipment of the battery.

Obviously the construction of grating or fabricated wire forming the several walls and floor may be of any desired construction and the size and proportion of the several parts may be changed to vary the size and capacity of the structure without departing from the spirit of the invention, and other changes within the scope of the appended claims are contemplated. I do not therefore limit myself to the particular construction and arrangement shown.

Having thus fully described my invention, what I claim is:—

1. A battery poultry crate including a frame comprising side frame members having vertical end posts, and end frame members having vertical end slats and transverse horizontal spaced bars secured between the slats, said end frame members being secured between the side frame members with said slats secured to the sides of said posts, and said transverse bars of the end frame members being secured at their ends to said slats by means extending through the slats into the ends of the bars, foraminous floors extending horizontally across the frame and within the same adjacent said bars of the end members, and trays beneath the several floors supported by said bars.

2. A battery poultry crate including a frame comprising side frame members having vertical end posts and an intermediate post, end frame members having vertical end slats and a pair of vertical centrally disposed slats and horizontal bars secured between the end slats and intermediate slats by means passing through the slats into the ends of the bars, said pair of intermediate slats being secured together after the securing of the ends of the bars thereto, an intermediate frame member having vertical end slats, and horizontal bars secured at their ends between said slats by means passing through the slats into the ends of the bars, said end and intermediate frame members being secured between the side frame members by securing the end slats to the posts in the side frame members, foraminous floors extending horizontally across the frame within the same adjacent the several horizontal bars, and a plurality of trays beneath each floor and supported at their ends by said bars of the end and intermediate frame members.

3. A battery poultry crate comprising an open frame having side frame members provided with vertical end posts and an intermediate vertical post with horizontally disposed spaced bars connecting the posts, said frame also having end and intermediate frame members formed with vertical end slats and horizontally disposed spaced bars secured at their ends to the slats by means passing through the slats into the ends of the bars, said end and intermediate frame members being secured between the side frame members by securing said slats to the inner sides of said posts, horizontally extending strips of woven wire fabric forming a plurality of floors extending horizontally adjacent the several transverse bars of the end and intermediate frame members, said fabric floors being each secured at their ends to a transverse bar, means for securing said bars at their ends to the end posts of the side frames and for adjusting said bars toward and from said posts to stretch the woven floor fabric, and foraminous walls dividing the space between each floor and its adjacent floor into a plurality of compartments, and a tray beneath each compartment slidable through the side frame members.

4. A battery poultry crate comprising an open frame of rectangular form, a covering of fabricated wire forming the outer walls of said frame, strips of fabricated wire dividing the space within the frame horizontally to provide a series of superposed compartments, and two strips of fabricated wire grating secured at their ends to the frame and bent at right angles intermediate their ends with the angular bend in one strip overlapping the angular bend of the other strip and interlocked therewith to divide this space between floors into a plurality of compartments.

5. In a battery poultry crate, dividing walls of fabricated wire, comprising two strips of fabricated wire each secured at their ends and bent intermediate their ends with their bends overlapped at the meeting angle of the wall formed by said strips, means engaging the angular bends of said strips to secure the same together at their meeting angles.

6. A battery poultry crate comprising a rectangular open frame, outer walls of fabricated wire material secured to said frame, said frame having a plurality of horizontally disposed transverse bars, foraminous horizontally disposed strips within the frame extending across the same adjacent said bars and dividing the space within the frame, said strips forming foraminous floors, foraminous walls dividing the space between each floor and its adjacent floor into four rectangular compartments, said walls comprising two strips of fabricated wire secured at their ends to the frame and bent at right angles intermediate their ends with the angular bend of one strip overlapping the angular bend of the other strip at substantially the central vertical axis of the frame, and a rod engaging within the angular bends of the strips to secure the strips together and position the walls to divide each floor space into four compartments.

In testimony whereof I affix my signature in presence of two witnesses.

JAMES BYRON DANLEY.

Witnesses:
 CHARLES W. STAUFFIGER,
 KARL H. BUTLER.